March 19, 1963  V. J. NEARY  3,081,549
GRIP MEASURING DEVICE FOR BOWLERS
Filed Jan. 28, 1960  3 Sheets-Sheet 1

INVENTOR.
VINCENT J. NEARY
BY
ATTORNEY

March 19, 1963
V. J. NEARY
3,081,549
GRIP MEASURING DEVICE FOR BOWLERS
Filed Jan. 28, 1960
3 Sheets-Sheet 2
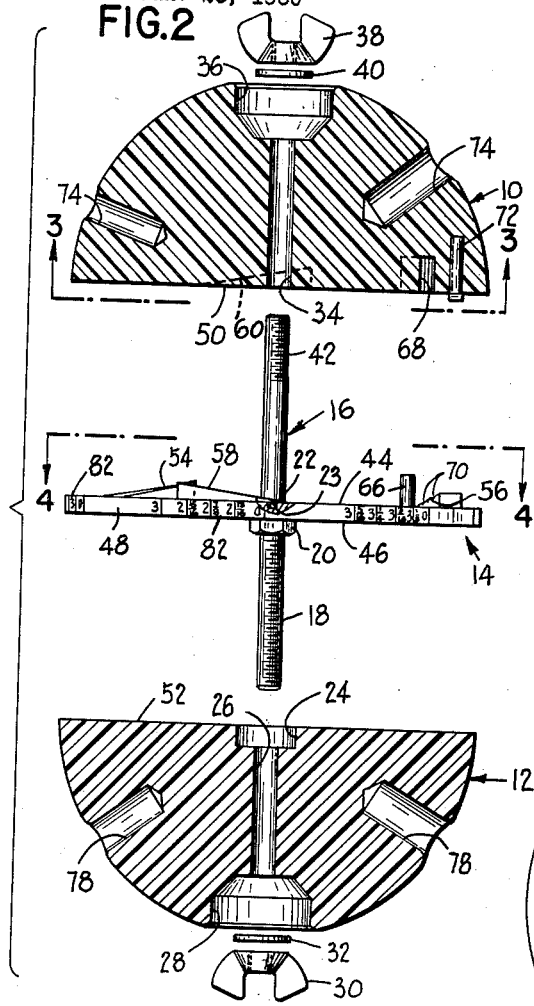
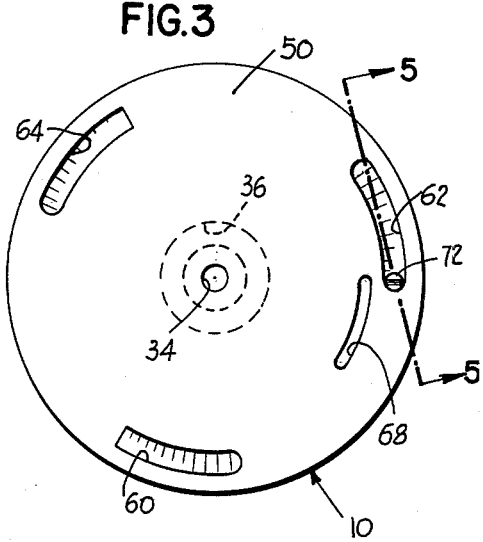
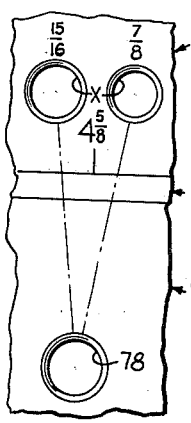
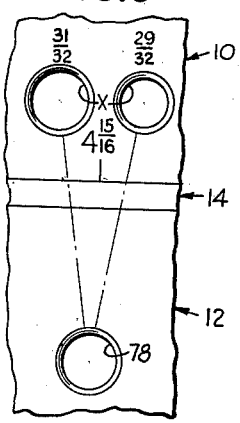
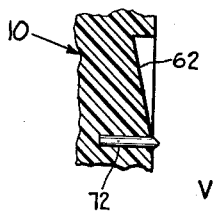
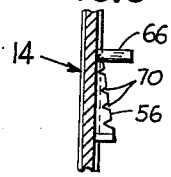
INVENTOR.
VINCENT J. NEARY
BY
*Wentworth S. Clapham*
ATTORNEY March 19, 1963     V. J. NEARY     3,081,549
GRIP MEASURING DEVICE FOR BOWLERS
Filed Jan. 28, 1960     3 Sheets-Sheet 3

INVENTOR.
VINCENT J. NEARY
BY
ATTORNEY

United States Patent Office 3,081,549
Patented Mar. 19, 1963

3,081,549
GRIP MEASURING DEVICE FOR BOWLERS
Vincent J. Neary, Glenview, Ill., assignor to American Machine & Foundry Company, a corporation of New Jersey
Filed Jan. 28, 1960, Ser. No. 5,172
8 Claims. (Cl. 33—174)

This invention relates to a grip measuring device for bowlers, and more particularly to a device which may be employed to determine the thumb size, finger size, and span between thumb and fingers of the hand of a bowler.

With increased popularity of bowling as a sport and recreational activity, and increased sale of "personalized" bowling balls, need has grown for an improved bowler's grip measuring device, one which is simpler to manufacture and use, and more versatile than comparable devices known theretofore. In ten pin bowling the desirability of a ball having thumb and finger holes that are tailored to the individual bowler's hand has long been recognized. In order to locate and size the holes properly, measurements must be made to determine thumb size, finger size, and span. The devices proposed heretofore for making such measurements have been deficient in one or more respects. Some of them lack the ability to provide all of the desired measurements or to provide such measurements without computation. Others provide the data required, but with attendant complexity and expense.

It is accordingly a principal object of the present invention to provide an improved grip measuring device for bowlers that is simpler, more economical, and more versatile than comparable devices employed heretofore.

Another object of the invention is to provide a device of the foregoing type which comprises only three main parts and which gives direct readings of thumb size, finger size, and span.

A further object of the invention is to provide a device of the foregoing type which resembles a conventional bowling ball and which has a smooth exterior, so that it may be handled like a bowling ball without danger of injuring the hands.

The foregoing and other objects, advantages, and features of the invention and the manner in which the same are accomplished will become more readily apparent upon consideration of the following detailed description of the invention taken in conjunction with the accompanying drawings, which illustrate a preferred and exemplary embodiment of the invention, and wherein:

FIGURE 2 is a sectional exploded view illustrating the relationship of the parts of the invention;

FIGURE 3 is a bottom plan view of one part of the invention as seen in the direction of the arrows 3—3 of FIGURE 2;

FIGURE 4 is a top plan view of another part of the invention as seen in the direction of the arrows 4—4 of FIGURE 2;

FIGURE 5 is a sectional view taken along line 5—5 of FIGURE 3 and illustrating a detail of the invention;

FIGURE 6 is a sectional view taken along line 6—6 of FIGURE 4 and illustrating another detail of the invention;

FIGURE 8 is a truncated side elevation view illustrating another detail of the invention; and FIGURE 9 is another truncated side elevation view illustrating a similar detail of the invention.

Briefly stated, the invention comprises three main parts, which, when assembled, form a substantially complete sphere resembling a conventional ten pin bowling ball. Two of the parts are substantially hemispherical and are arranged to mate with the opposite sides of the third part, which is shaped like a disk. The parts are held on an axial shaft and are mounted to permit relative rotation about the axis of the shaft as well as relative radial or axial movement of the hemispheres. One of the hemispherical parts has finger holes, and the other hemispherical part has thumb holes, the holes being graduated in size. The parts are provided with indicia and correlated calibrations which permit accurate measurements of the grip of a bowler.

Figure 1:
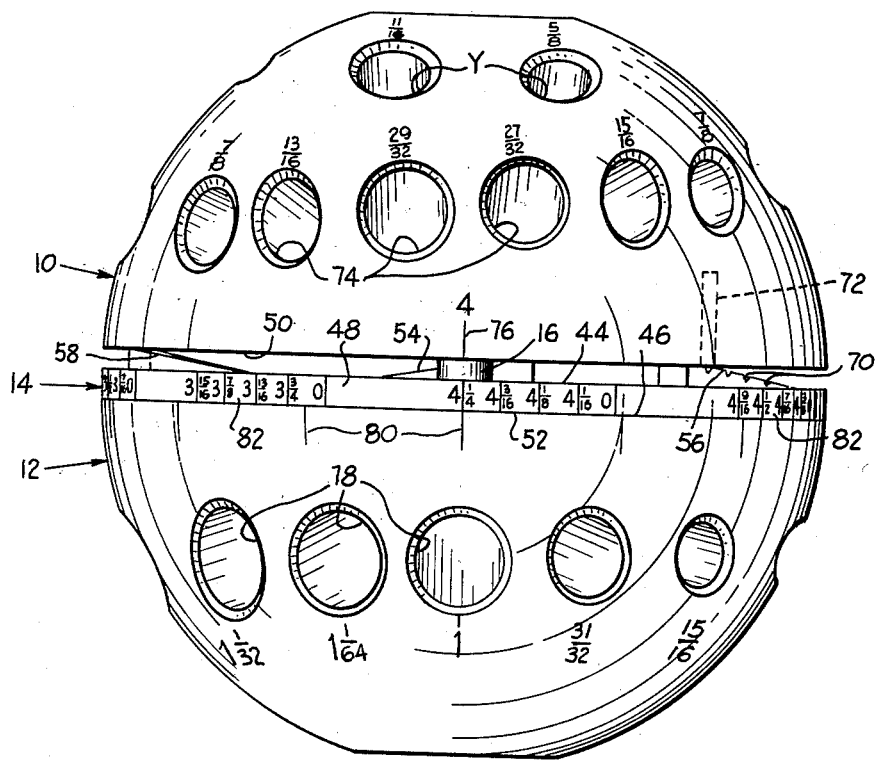
FIGURE 1 is a side elevation view of the device of the invention illustrated as the device appears in use.

Referring to the drawings, and initially to FIGURE 1 thereof, the device of the invention comprises the three main parts designated 10, 12, and 14. As shown, parts 10 and 12 are substantially hemispherical, although the ends may be flattened somewhat to permit the device to be placed on a flat surface without rolling. Part 14 is disk shaped. Parts 10 and 12 may be formed of hard rubber or of any other suitable material, such as those from which conventional bowling balls are formed. The disk 14 could be formed of the same material but is preferably made of aluminum. Since the disk is located substantially at a diametral plane of the device (between the hemispheres), its circumferential surface may be made cylindrical without detracting from the over-all spherical configuration of the device.

FIGURE 2 illustrates the parts of FIGURE 1 in sectional and exploded form. It can be seen that disk 14, which may be termed an actuator disk, is mounted on a shaft 16. The shaft is threaded at 18 from one end thereof to the disk and receives a nut 20, which engages the lower surface of the disk and which acts in conjunction with a pin 22 to fix the disk to the shaft. The pin passes through a bore in the shaft and is received within a recess 23 in the upper surface of the disk. Hemispherical part 12 has a recess 24 to receive the nut 20 and has an aligned axial bore 26 which extends from recess 24 to a recess 28 at the spherical surface of part 12. The recess 24 and the bore 26 have sufficient working clearance with respect to the nut 20 and the shaft 16, respectively, to permit the hemisphere 12 to rotate on the shaft. The hemisphere 12 may be fixed against rotation by a wing nut 30, which is threaded onto the portion 18 of the shaft over a washer 32, recess 28 being large enough to accommodate rotation of the wing nut.

The hemispherical part 10 has a bore 34 and a recess 36 which correspond in function to the bore 26 and the recess 28 of the hemisphere 12. Thus, the bore 34 receives the upper part of shaft 16 and permits rotation of hemisphere 10 on the shaft, and the recess 36 receives a wing nut 38 which is threaded onto the upper end of shaft 16 over a washer 40. In this connection, threads 42 are provided at the upper end of shaft 16 but need not extend to the disk as do the lower threads 18.

The disk 14 is bounded by parallel upper and lower surfaces 44 and 46, which intersect its cylindrical surface 48. When parts 10, 12, and 14 are assembled on the shaft 16, the surfaces 44 and 46 are parallel to mating surfaces 50 and 52 of the hemispheres, respectively, and all these surfaces lie in chordal planes of the complete sphere.

It is apparent from the foregoing description that parts 10, 12, and 14 may be rotated relative to each other about the axis of the shaft 16 and may be fixed against rotation by the tightening of the wing nuts 30 and 38. It is also desired that parts 10 and 12 be relatively movable in a radial direction, that is, along the axis of the shaft 16. To this end, disk 14 is provided with cam means, which in the embodiment illustrated, take the form of a plurality of arcuate cam inclines 54, 56, and 58 formed on the upper surface of disk 14 and located so as to lie on a circle on that surface, as indicated by the dash line in FIGURE 4. As can be seen in FIGURES 1 and 2, the inclines rise in the same direction. If the disk 14 is made of cast aluminum, for example, the inclines may be integral therewith.

Hemisphere 10 is provided with a plurality of wedge-shaped cam recesses 60, 62, and 64 which mate with the cam inclines 54, 56, and 58, respectively. Each of the cam recesses is adapted to receive its corresponding cam incline so that for one rotational position of the hemisphere 10 with respect to the disk 14, the surfaces 44 and 50 may be placed in mating juxtaposition. If the hemisphere 10 is rotated with respect to the disk 14 in one direction, the cooperating surfaces of the cam inclines on the disk 14 and the cam recesses in the hemisphere 10 slide one upon the other and move the surfaces 44 and 50 apart. Relative rotation of parts 10 and 14 is limited by a pin 66 which projects from the upper surface of the disk 14 and which slides in an arcuate groove 68 in the surface 50 of the hemisphere 10. Incline 56 is provided with a series of indexing notches 70 (see FIG. 6) which cooperate with the beveled tip of indexing pin 72 protruding from the end of recess 62 (see FIG. 5). It is thus possible to obtain very precise rotational positioning of the hemisphere 10 with respect to the disk 14.

Figure 7:
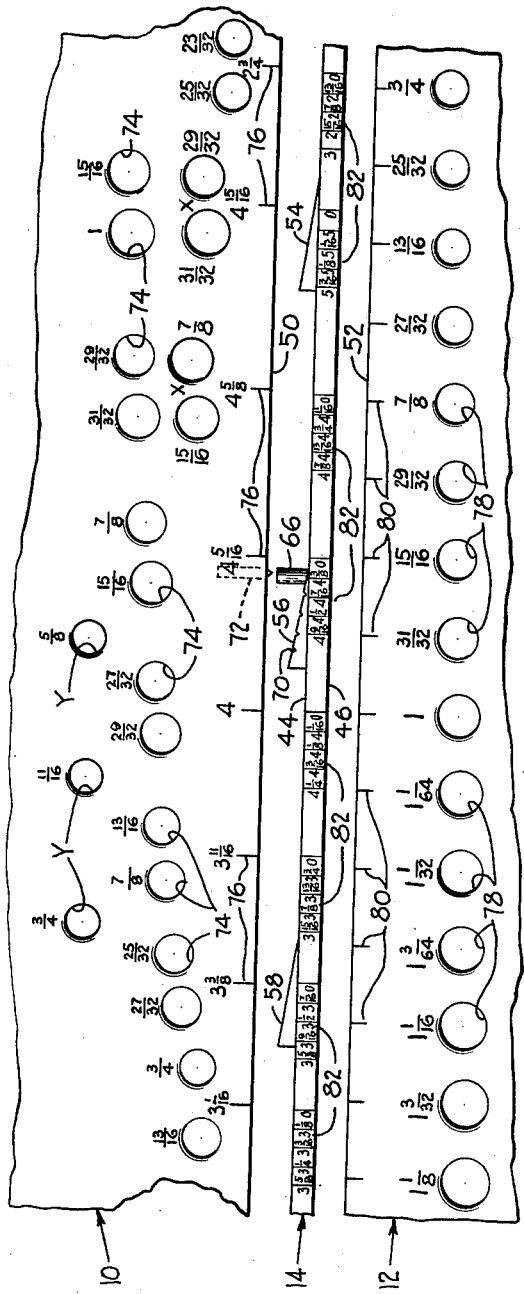
FIGURE 7 is a developmental view illustrating the placement of thumb holes, finger holes, and calibration markings.

The hemisphere 10 may be termed the finger hole half of the device and is provided wtih a plurality of sets of finger holes 74 bored radially into the hemispherical surface. As shown in the developmental view of FIGURE 7, the finger holes 74 are arranged in pairs, the holes of which are graduated from 25/32" and 23/32" in diameter for a first pair to 1" and 15/16" in diameter for a last pair, the hole size being marked by suitable indicia. Since most bowlers are right-handed, the left hole of each pair is the larger and accommodates the middle finger, the right hole accommodating the ring finger. It will be noted that the finger holes 74 are arranged so that the plurality of holes is inclined to the surface 50 at an acute angle, the larger holes being farther from surface 50. The series of graduated holes just mentioned includes eight sets or pairs. Two additional pairs are illustrated in FIGURE 7 and their holes are designated by the letter X. These pairs are used by bowlers having short stubby fingers. The three single holes designated Y are employed in measuring bowlers who prefer a grip comprising one finger and the thumb. The finger hole half also has calibrated span markings ranging from 2¾" to 4 15/16". The markings are located about the periphery of surface 50, and each marking is accompanied by a vertical line 76 which extends to the surface 50 and is aligned with the web between the holes 74 of a pair.

The hemisphere 12, which may be termed the thumb hole half, has a plurality of thumb holes 78 bored therein like the finger holes of the hemisphere 10 (there being 15 thumb holes in the form shown). The thumb holes are graduated in size from ¾" to 1⅛", the hole size being marked by appropriate indicia. Each thumb hole has a vertical line 80 at the periphery of surface 52 and which, if extended, would bisect the corresponding thumb hole. The plurality of thumb holes 78 is arranged so as to be inclined to the surface 52 at an acute angle with the larger holes farther from surface 52.

The actuator ring 14 has a pluraltiy of segments 82 (there being 8 in the form shown) spaced about its periphery. These segments correspond to the eight direct reading span lines 76 on the finger hole half of the device. Each segment has five vertical lines which are appropriately spaced and which have accompanying indicia graduated in increments of 1/16 of an inch, the zero lines corresponding to the readings at the span lines on the finger hole half.

To use the measuring device of the invention, the parts are assembled to form a complete ball as shown in FIGURE 1, but the cam inclines are aligned with the cam recesses so that the surfaces 44 and 50 are in contact like the surfaces 46 and 52. In this position the span lines 76 of the finger hole half are aligned with the corresponding zero lines of the actuator disk. The wing nuts should be snug. The proper thumb hole size is chosen by placing the thumb in the holes 78 of the thumb hole half until a comfortable fit is obtained. Then the proper finger hole set is selected by placing the middle and ring fingers in the appropriate finger holes 74 until a comfortable fit is obtained. Then the wing nut on the thumb hole half is loosened, and the thumb hole half is rotated relative to parts 10 and 14 until the selected thumb hole has its span line 80 aligned with the zero line of the acutator disk that is opposite the span line 76 corresponding to the chosen finger hole set. In most cases, this gives the approximate span. If a greater span is required, the wing nut associated with the finger hole half is loosened, and the finger hole half is rotated relative to parts 12 and 14 until the correct span is obtained. Such rotary movement of the finger hole half causes the cams associated with parts 10 and 14 to urge these parts away from each other to increase the span. Indexing is obtained through the cooperation of the pin 72 and the indexing grooves 70, and a click is heard for each indexing step. The indexing means is located so that for each step of rotation of the finger hole half the lines 76 will be aligned with successive lines of the segments 82 on the actuator disk. When the proper span has been obtained, the finger hole wing nut is tightened, and then the thumb hole wing nut is loosened and the thumb hole half rotated to place the span line 80 of the selected thumb hole in alignment with the span line 76 of the selected finger holes. The correct span may then be read directly from indicia of the actuator disk at the actuator line coincident with the span lines of the hemispheres.

For left-hand bowlers, the proper thumb hole is selected in the manner previously described. To find the proper finger hole set, the middle finger is placed in the larger of the two holes in any set. When the middle finger hole has been determined, the middle finger is removed, and the ring finger is placed in the smaller of the two holes to confirm the choice. The correct span is determined in the manner previously described, using the middle finger hole or the ring finger hole, and the selected thumb hole.

The sets of finger holes designated by the letter X in FIGURE 7 are employed for measuring the span of bowlers having short stubby fingers. These sets are aligned with the chosen thumb hole as shown in FIGURES 8 and 9, but the span measurement must be obtained from an external scale placed on the surface of the ball. The finger holes designated by the letter Y in FIGURE 7 are used like the holes X when the bowler employs a single finger and thumb grip. Here again, the span is read from an external scale.

From the foregoing description, it is apparent that the invention provides a unique and improved device for measuring the grip of a bowler. While a preferred embodiment of the invention has been shown and described, it will be apparent to those skilled in the art that changes can be made without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

The invention claimed is:

1. A bowling ball grip measuring device, comprising a ball divided into a pair of outer dome-shape parts and an intermediate disc-shape part, means mounting all said parts of relative rotation about a common straight axis and mounting said outer parts for relative axial movement, means for holding said outer parts fixed with respect to said intermediate part, one of said outer parts and said intermediate part having opposed end surfaces with adjacent circular peripheries in planes perpendicular to said axis, the other of said outer parts and said intermediate part having opposed end surfaces provided with cooperating cam incline and follower means for causing relative axial movement of the last-mentioned parts in response to relative rotation thereof, one of said outer parts having a series of graduated thumb holes, and the other of said outer parts having a series of graduated fingers holes, one of said series of holes being inclined at an acute angle to said planes, whereby rotation of said one outer part relative to said intermediate part and said other outer part permits a selected thumb hole to be matched with a selected finger hole and gives an approximation of the grip span and whereby axial movement of said other outer part with respect to said intermediate part and said one outer part permits fine adjustment of the span.

2. The device of claim 1, wherein said finger holes are arranged in pairs.

3. The device of claim 1, wherein said cam incline and follower means comprise a plurality of cooperating cam projections and mating recesses on their respective opposed end surfaces.

4. The device of claim 1, wherein all said end surfaces lie substantially in chordal planes of said divided ball.

5. The device of claim 1, wherein said cam means have cooperating indexing means associated therewith.

6. The device of claim 1, further comprising means for limiting the relative rotation of said other outer part and said intermediate part.

7. The device of claim 1, said mounting means comprising a shaft having said intermediate part fixed to its central portion, said shaft passing into said outer parts, said part holding means comprising nuts threaded onto the ends of said shaft.

8. The device of claim 1, said outer parts having scale marks spaced about the periphery of their said end surfaces in association with said finger and thumb holes, respectively, said intermediate part having groups of scale marks and vernier span indicia spaced about its circumference and alignable with scale marks on said outer parts to give a direct reading of the span.

References Cited in the file of this patent

UNITED STATES PATENTS

| | | |
|---|---|---|
| 2,188,868 | Shepard | Jan. 30, 1940 |
| 2,221,938 | Barry | Nov. 19, 1940 |
| 2,393,908 | Hubbard | Jan. 29, 1946 |
| 2,453,036 | Reitsma | Nov. 2, 1948 |
| 2,703,934 | Jast | Mar. 15, 1955 |